United States Patent [19]

Grochal

[11] Patent Number: 5,016,412
[45] Date of Patent: May 21, 1991

[54] COMPOUND THERMAL INSULATING SYSTEM

[75] Inventor: Peter Grochal, Waldshut-Tiengen, Fed. Rep. of Germany

[73] Assignee: Sto AG, Stuhlingen, Fed. Rep. of Germany

[21] Appl. No.: 438,417

[22] PCT Filed: Mar. 14, 1989

[86] PCT No.: PCT/EP89/00267

§ 371 Date: Nov. 14, 1989

§ 102(e) Date: Nov. 14, 1989

[30] Foreign Application Priority Data

Mar. 14, 1988 [DE] Fed. Rep. of Germany ....... 3808482

[51] Int. Cl.$^5$ .............................. F24J 2/04; F24J 2/00; E04B 1/74
[52] U.S. Cl. ......................................... 52/302; 52/306; 52/309.8; 52/404; 52/506; 126/447; 126/450; 126/901
[58] Field of Search ............... 126/417, 450, 439, 449, 126/445, 447, 901; 52/306, 173, 200, 404, 309.8, 506, 302, 303

[56] References Cited

U.S. PATENT DOCUMENTS

| | | |
|---|---|---|
| 2,975,853 | 3/1961 | Friend .................... 52/306 |
| 4,078,548 | 3/1978 | Kapany ................... 126/449 |
| 4,303,732 | 12/1981 | Torobin .................. 126/450 |
| 4,596,237 | 6/1986 | Melchior ................. 52/306 |
| 4,846,151 | 7/1989 | Simko ..................... 126/450 |

FOREIGN PATENT DOCUMENTS

| | | |
|---|---|---|
| 0123091 | 10/1984 | European Pat. Off. . |
| 2906259 | 8/1980 | Fed. Rep. of Germany . |
| 3214421 | 10/1983 | Fed. Rep. of Germany . |
| 3435613 | 4/1985 | Fed. Rep. of Germany . |

OTHER PUBLICATIONS

"Aussenwande mit Transparenten Warmedämmstoffen", by Gertis, Bauphysik, 5/1987, pp. 213–214.

*Primary Examiner*—John E. Murtagh
*Attorney, Agent, or Firm*—Fleit, Jacobson, Cohn, Price, Holman & Stern

[57] ABSTRACT

The compound thermal insulating system, which can be attached to a building wall with a light-absorbent exterior wall surface comprises at least partially transparent thermal insulating material which is externally projected against the effects of weather. In order to guarantee in a particularly simple fashion the sure protection of the thermal insulating material against external influences, particularly against the effects of weather, the thermal insulating material is provided with a weather-resistant protective coating consisting of at least partially transparent filler which contains a curing binder sufficient to provide a radiation transmission ratio for vertical sunlight of greater than 20%, given coating thicknesses between 0.5 mm and 6 mm. A transparent reinforcement is effectively positioned between the insulating material and the protective coating.

20 Claims, 1 Drawing Sheet

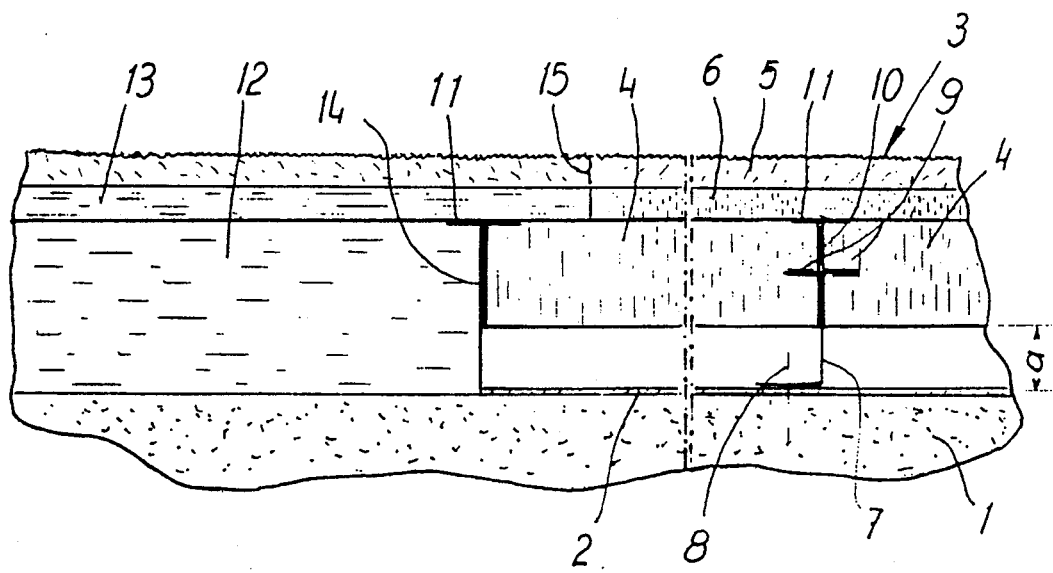

COMPOUND THERMAL INSULATING SYSTEM

BACKGROUND OF THE INVENTION

1. Field of the Invention

The invention relates to a compound thermal insulating system that can be attached to a building wall with a light-absorbent external wall surface, which system include an at least partially transparent insulating material protected externally from the effects of weather.

2. Description of the Prior Art

In compound thermal insulating systems known to the prior art (EP-B 0 123 091), a transparent external coating for the absorption of solar energy is provided on the outside of the insulating material in the form of foils or disks of silicate or acrylic glass, particularly pressed glass. Such application occurs in the form of prefabricated units which resemble windows and which are bound in aluminum frames. These units can hardly be used in the renovation of older structures. In the case of new structures their use must be planned as early as the drafting stage. In addition, it is impossible to avoid partition lines with these panel shaped, brick-shaped, or belt-shaped panes. Production of this kind of external facing is not only very complicated, time-consuming, but expensive. It is also very difficult to give this transparent outer coating the necessary strength and stability to guarantee these properties over long periods of time. In addition, the range of architectural design permitted by this compound thermal insulating system is very limited, particularly when it is employed in geometrically complex parts of a facade. Another problem is the fact that, due to the high transparency, a transmission ratio of 50% and sometime more, results so what shading in the form of blinds, shades, or the like must be provided—which devices must, be set by a regulating device or must be continuously manually adjusted. Due to the water vapor permeability of the employed panes, considerable problems with condensation arise in the case of temperature fluctuations, particularly when outside temperatures drop below the freezing point.

SUMMARY OF THE INVENTION

The present invention is based on the use of a the compound thermal insulating system of the type mentioned in such a way that, in a particularly simple fashion, the insulating material is afforded certain protection against external influences, particularly against the effects of weather, without, however, impeding the desired light absorption effect.

The inventive compound thermal insulating system of the present invention provides the insulating material with a weather-resistant protective coating consisting of a filler that is at least partially transparent and contains a quantity of curing binder sufficient to guarantee a radiation transmission ratio for vertical sunlight of more than 20%, given coating thicknesses between 0.5 mm and 6 mm. The weather-resistant protective coating can be applied like conventional plaster, and required solid bond results automatically. Expensive auxiliary devices for bracing, such as those required to secure glass panes, are not necessary in the production of this protective coating of a plaster-like nature. Aesthetically unattractive joints or frame structures, which restrict the range of design in the renovation of old buildings, are unnecessary. By application of transparent insulating material, which permits the penetration of sunlight up to an opaque layer covered by the insulation, and by the subsequent plaster-like application of the weather-resistant coating containing the indicated transparent filler the building can be enclosed inexpensively, very simply, and in a way that both serves to utilize solar energy and is, at the same time, aesthetically pleasing. The system permits the diffusion of vapor, so problems concerning condensation are avoided. The previously necessary application of panel-like, brick-like, or belt-like panes covering the transparent insulation and providing external protection is eliminated by the application of the plaster-like coating according to the invention Also to be emphasized is the fact that the weather-resistant layer eliminates the ungainly appearance familiar in conventional plaster applications apparently due to the indicated high degree of transparency, which maintains itself after application and curing; instead, this feature lends the coated structure a particularly attractive decorative exterior.

The positioning of a transparent reinforcement between the thermal insulating material and the outer plaster-like transparent protective coating has proven to be highly advantageous in protecting the insulating material in its functional integrity and over long periods of time.

A particularly easy, fast, an safe attachment of the insulating material to the exterior wall surface results when an adhesive coating is employed. Coating with transparent knifing filler as a smooth lower layer on old masonry has proven to be advantageous; when necessary a second and identical layer can be applied to the lower layer after the latter has dried in order to then anchor the insulating material with this layer. To guarantee the desired absorption, a black coating can be applied before the first or second layer of knifing filler, or the second knifing layer can be tinged with black. In attaching the insulating material to the base it has proven to be particularly favorable to employ the insulating material in the form of insulating panels.

Preferred transparent insulating panels include capillary panels, honeycomb panels, structural foam panels, or fiber panels consisting of light-resistant, highly transparent plastics, e.g. polycarbonate and polymethylmethacrylate, among others. The use of panels of fiberglass, glass foam, or glass capillary tubes is also possible.

The indicated adhesive coating can serve simultaneously and to good effect as the light-absorptive coating, more specifically, as the light-absorptive exterior wall surface. Materials with a thermal conductivity of greater than 0.5 [W/mK] have proven to be favorable for the adhesive and absorptive layer, e.g. hydraulically adhesive materials tempered with plastic.

To achieve greater strength along with a favorable phototransmission, the transparent reinforcement takes the form of a layer of transparent knifing filler, which can be strengthened with an embedded glass and/or plastic fabric.

In a further embodiment of the compound insulating system, in which opaque insulating material is attached to one of the building walls, it has proven to be effective for the opaque insulating material to be attached only in certain areas of the building wall and continuously connected with the transparent insulating material which is attached in other specific areas of the building wall.

A particularly easy application of the composite insulating system results when both the opaque insulating material and the transparent insulating material are designed in the form of insulating panels and are attached to the exterior wall surface.

To create a continuous connection between the opaque insulating panels and the transparent insulating panels it is useful to apply the reinforcement covering the opaque panels across the panel abutments between the opaque and transparent insulating panels and up to the fringe area of the transparent panels; here the transparent reinforcement covering the transparent insulating panels should rest immediately against and flush with the former reinforcement.

In order to control heating the building interior by thermal energy absorbed via sunlight on the surface of the building wall, or to otherwise utilize the captured energy, it has proven to be effective to attach the insulating material at a distance from the transparent exterior wall surface such as to permit backventilation. In this fashion channels will arise between the insulating material and the external wall surface in which heated air can rise and escape through a heat outlet, when valves or the like which permit the circulation of air are opened in the lower and upper areas of the back-ventilation channels. From the structural viewpoint it is advantageous to attach the transparent insulating material to support structures secured to the building wall.

It has proven to be particularly effective to employ organic binders, particularly synthetic resins in the form of a dispersion or a solution, as binders for the weather-resistant protective coating. Here the material for the protective coating will efficaciously include polyacrylates, polymethacrylates, copolymers of the latter, the copolymers of styrene, ethylene, vinylacetate, and fluorethylene, silicon resins, polycarbonates, epoxides, and polyurethanes. The polyacrylate and methacrylate copolymers are particularly advantageous due to their very good photo-stability.

As an alternative, the binder for the weather-resistant coating can consist of inorganic binders, particularly water glass.

In order to simply and economically assure the questionable transparency and thus both the absorption of solar energy and the decorative effect, it is advantageous if the fillers provided in the material of the applied, plaster-like protective coating consist at least partially of inorganic glass fillers, such as glass gravel, glass balls, or lentiform glass bodies, or of crystalline silicates or carbonates. Organic plastic granulates of any form, with a polymethylacrylate, polycarbonate, polystyrene, etc. base, which excel because of the their low specific weight, have proven to be effective as filler material for the protective coating.

Further details, advantages, and features of the invention emerge from the following description based on the accompanying drawing in which the compound thermal insulating system is depicted in its principle structure, but in an extremely schematic fashion and without at all being true to scale.

BRIEF DESCRIPTION OF THE DRAWING

The FIGURE shows a schematic drawing of the preferred embodiment of the invention.

DETAILED DESCRIPTION OF THE INVENTION

As can be seen from the FIGURE, a compound thermal insulating system 3 can be attached to a building wall 1 with a light-aborbent exterior wall surface 2. This system includes at least partially transparent thermal insulating material 4, which is externally protected against the effects of weather. To this end, the insulating material 4 is provided with a weather-resistant protective coating 5 consisting of at least partially transparent filler containing a quantity of a curing binder sufficient to guarantee a radiation transmission ratio for vertical sunlight of more than 20%, given coating thicknesses between 0.5 mm and 6 mm. A transparent reinforcement 6 is positioned between the coating 5 and the insulating material 4. The insulating material 4 can be attached directly to the external wall surface 2 by means of an adhesive coating. This form of attaching the insulating material 4 can be executed with particular ease when the material takes the form of insulating panels. The insulating panels 4 can be effectively designed as capillary panels, i.e. can consist of a number of plastic tubes which are interconnected and rest against each other, with an inner diameter of 1 to 3.5 mm, preferably 2.5 mm, and which rest on a diagonal to the plane of the panel, i.e. which are oriented in the direction of the incoming light. The tubes are connected, e.g. in the course of sectioning, by means of a resistance wire, i.e. are connected at the tube ends located on the planes of the external panel surfaces. Upon application of the protective coating 5 directly or before the reinforcement 6, the material penetrates somewhat into the capillary openings and in set condition contributes to the reciprocal support of the tube ends. When the insulating material 4 is employed in the form of panels, it can also be attached—as in the diagram—at a distance a from the lightabsorbent exterior wall surface 2 such that in open space 8 is possible. To this end a support structure 7 is attached to the building wall, for example by means of screws. This support structure 7 includes an arm extending diagonally from the wall 1, with lateral projections 9 which interlock with slit-like recesses in the rim area of the insulating panels 4. An alternative mode of attachment, which is not shown, consists in cementing the support structure to the back of the insulating panel.

When the thermal insulating panels 4 are directly attached to the building wall 1 an adhesive coating 2 is employed that can simultaneously serve as the light-absorbent exterior wall surface 2.

It can be seen from the FIGURE that the area of the panel abutments 10 in the embodiment shown are additionally reinforced by a transparent adhesive band 11 with, for example, a polycarbonate base. The transparent reinforcement 6 applied immediately above is formed by a coating of transparent knifing filler, with a glass or plastic fabric embedded in it.

From the FIGURE it can also be seen that the transparent insulating material 4 can immediately adjoin the opaque insulating material 12 attached to the building wall and in such a way that the compound insulating system includes both an area that is at least partially transparent and an area that is opaque. Both the opaque insulating material 12 and the transparent insulating material in the form of insulating panels 4 are attached to the building wall 1. To create a continuous connection between the opaque insulating panels 12 and the transparent insulating panels 4, the reinforcement 13 covering the opaque panels is applied across the panel abutments 14 between the opaque and transparent insulating panels, up to the fringe area around the transparent panels 4. Resting flush against this reinforcement is the transparent reinforcement 6 which covers the transparent insulating panels 4. It is possible to employ the same weather-resistant protective coating 5 to cover both the opaque insulating material 12 and the transparent insulating material 4, when so desired by way of reinforcements 13 or 6. An alternative arrangement is to allow an opaque plaster application 16 to rest flush against the protective coating 5 at the transition zone 15 between one area and another.

The following examples give the composition of the material used for the protective coating according to the invention. The material indicated in examples 1 and 2 can be employed not only in the protective coating 5, but also in the reinforcement 6, when so desired with an embedded fabric.

EXAMPLE 1

| Composition of a first binder component | | |
|---|---|---|
| 93.8 | weight percent | acrylate dispersion |
| 0.7 | " | preservative |
| 3.5 | " | solvent |
| 1.0 | " | antifoaming agent |
| 1.0 | " | thickening agent |
| 100.0 | | |

EXAMPLE 2

| Composition of a second binder component | | |
|---|---|---|
| 25.0 | weight percent | acrylate resin |
| 71.5 | " | solvent |
| 0.5 | " | thickening agent |
| 3.0 | " | softener |
| 100.0 | | |

EXAMPLE 3

| coating | | |
|---|---|---|
| 15.0 | weight percent | binder from example 1 |
| 45.0 | " | glass gravel 1.5 mm |
| 40.0 | " | glass gravel 2.0 mm |
| 100.0 | | |

EXAMPLE 4

| 15.0 | weight percent | binder from example 1 |
|---|---|---|
| 45.0 | " | glass gravel 1.5 mm |
| 40.0 | " | glass balls 2.0 mm |
| 100.0 | | |

Measured radiation transmission ratio 44%

EXAMPLE 5

| 15.0 | weight percent | binder from example 1 |
|---|---|---|
| 45.0 | " | glass balls 1.5 mm |
| 40.0 | " | polycarbonate granulates 4.0 mm |
| 100.0 | | |

Measured radiation transmission ratio 49%

EXAMPLE 6

| 20.0 | weight percent | binder from example 2 |
|---|---|---|
| 40.0 | " | glass gravel 1.5 mm |
| 40.0 | " | glass gravel 4.0 mm |
| 100.0 | | |

Measured radiation transmission ratio 40%

EXAMPLE 7

| 20.0 | weight percent | binder from example 2 |
|---|---|---|
| 40.0 | " | glass gravel 1.5 mm |
| 40.0 | " | glass balls 2.0 mm |
| 100.0 | | |

Measured radiation transmission ratio 44%

EXAMPLE 8

| 20.0 | weight percent | binder from example 2 |
|---|---|---|
| 20.0 | " | glass balls 1 mm |
| 20.0 | " | glass balls 2 mm |
| 40.0 | " | glass balls 4 mm |
| 100.0 | | |

Measured radiation transmission ratio 54%

The use of inorganic glass fillers in the form of hollow glass balls or foamed glass in ground condition is particularly favorable with respect to achieving a low specific weight.

I claim:

1. Compound thermal insulating system attachable to a building wall having a light absorbent exterior wall surface, the system comprising:
   an at least partially transparent insulating material;
   a weather-resistant transparent plaster-like protective coating on the outer side of said insulating material for protecting said insulating material externally against the effects of weather, said protective coating having a thickness in the range between 0.5 mm and 6 mm and comprising at least partially transparent filler containing a hardening binder on a scale so that the radiation transmission ratio thereof for vertical sunlight is greater than 20%; and
   a transparent reinforcement between said insulating material and said protective coating.

2. Compound thermal insulating system as claimed in claim 1 wherein said insulating material is attached to the exterior wall surface by means of an adhesive coating.

3. Compound thermal insulating system as claimed in claim 1 wherein said insulating material comprises insulating panels.

4. Compound thermal insulating system as claimed in claim 3, wherein said insulating panels are selected from the group consisting of capillary panels, honeycomb panels, structural foam panels, fiber panels of light-resistant, highly transparent plastics, and fiberglass.

5. Compound thermal insulating system as claimed in claim 4, wherein said insulating panels are capillary panels comprising a plurality of inter-connected plastic tubes abutting against each other, each tube having an inner diameter of 1 to 3.5 mm and being positioned at an angle to the plane of the panel so that said tubes are oriented in the direction of incoming light.

6. Compound thermal insulating system as claimed in claim 5, wherein ends of said tubes, in the course of sectioning, are joined by fusion with a resistance wire located on the same planes as the external panel surfaces.

7. Compound thermal insulating system as claimed in claim 4, wherein said insulating panels are positioned in adjacent butting relationship, and transparent adhesive band means are provided at abutting areas for reinforcing said areas.

8. Compound thermal insulating system as claimed in claim 1 wherein an adhesive light-absorbent coating is provided between said insulating material and said exterior wall surface.

9. Compound thermal insulating system as claimed in claim 1 wherein said transparent reinforcement comprises a layer of transparent knifing filler.

10. Compound thermal insulating system as claimed in claim 9 wherein a material selected from the group consisting of glass fabric and plastic fabric is embedded in said transparent knifing filler.

11. Compound thermal insulating system as claimed in claim 1 and further comprising opaque insulating material applied to the building wall in discrete areas, and connected continuously in abutting relationship with said at least one partially transparent insulating material which is attached to other discrete areas of the building wall.

12. Compound thermal insulating system as claimed in claim 11, wherein both the opaque insulating material and the at least partially transparent insulating material comprise insulating panels attached to the external wall surface of the building.

13. Compound thermal insulating system as claimed in claim 12, wherein in creating the continuous connection between said opaque insulating material and said at least partially transparent insulating material a further reinforcement covering said opaque insulating material is applied across abutting edges of adjacent opaque and at least partially transparent insulating material and up to a rim area of said at least partially transparent insulating material, and said transparent reinforcement abuts immediately against and flush with said further reinforcement.

14. Compound thermal insulating system as claimed in claim 1, wherein said at least partially transparent insulating material is attached at a distance (a) from the exterior wall surface sufficient to provide a back-ventilation space therebetween.

15. Compound thermal insulating system as claimed in claim 4, and further comprising a support structure secured to the building wall, said at least partially transparent insulating material being attached to said support structure.

16. Compound thermal insulating system as claimed in claim 1, wherein organic binders in the form of a dispersion are employed as binders for said weather-resistant protective coating.

17. Compound thermal insulating system as claimed in claim 6, wherein said protective coating comprises a material selected from the group consisting of polyacrylates; copolymers of polyacrylates; copolymers of styrene, ethylene, vinylacetate and fluorinate ethylene; silicon resins; polycarbonates; epoxy resins; and polyurethanes.

18. Compound thermal insulating system as claimed in claim 1, wherein said weather-resistant protective coating comprises inorganic binders.

19. Compound thermal insulating system as claimed in claim 1, wherein said protective coating comprises inorganic glass fillers.

20. Compound thermal insulating system as claimed in claim 1, wherein fillers are provided in said protective coating comprising organic plastic granulates with a base selected from the group consisting of polymethylacrylate, polycarbonate, and polystyrene.

* * * * *